United States Patent
Graves et al.

(10) Patent No.: US 9,751,480 B1
(45) Date of Patent: Sep. 5, 2017

(54) CRUSH BOX FOR VEHICLE IMPACT

(71) Applicant: Toyota Motor Engineering & Manufacturing North America, Inc., Erlanger, KY (US)

(72) Inventors: William F. Graves, Ann Arbor, MI (US); Ryan A. Mikolaizik, Grand Blanc, MI (US); Tyler E. Schnug, Northville, MI (US); Mark D. Clauser, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/137,728

(22) Filed: Apr. 25, 2016

(51) Int. Cl.
*B60R 19/34* (2006.01)
*B60R 19/26* (2006.01)

(52) U.S. Cl.
CPC .............. *B60R 19/34* (2013.01); *B60R 19/26* (2013.01)

(58) Field of Classification Search
CPC .......... B60R 19/24; B60R 19/26; B60R 19/34
USPC ................................................. 293/132, 133
See application file for complete search history.

(56) References Cited

U.S. PATENT DOCUMENTS

| 6,814,381 B1 | 11/2004 | Frank | |
| 8,191,943 B2 | 6/2012 | Hellstrom | |
| 9,139,146 B2 | 9/2015 | Nakanishi | |
| 2013/0119682 A1* | 5/2013 | Matuschek | B60R 19/34 293/133 |
| 2014/0125073 A1* | 5/2014 | Yamada | B21D 53/88 293/133 |
| 2015/0314743 A1* | 11/2015 | Matsushiro | B60R 19/023 293/133 |

FOREIGN PATENT DOCUMENTS

| JP | 2005178417 | 7/2005 |
| KR | 20090058860 | 6/2009 |

OTHER PUBLICATIONS

European Aluminium Association; "Applications—Car body—Crash Management Systems"; URL: http://www.european-aluminium.eu/wp-content/uploads/2011/12/4_AAM_Crash-managementsystems1.pdf; Publication: The Aluminium Automotive Manual, pp. 1-26, Version 2013.

* cited by examiner

*Primary Examiner* — Jason S Daniels
(74) *Attorney, Agent, or Firm* — Dinsmore & Shohl LLP

(57) ABSTRACT

Embodiments of a crush box are described. One embodiment of the crush box includes a first sidewall that is coupled to a vehicle and a second sidewall that is coupled to the vehicle, where the first sidewall and the second sidewall include similarly pre-bent portions that cause the first sidewall and the second sidewall to bend outward upon receipt of a force. In some embodiments, the first sidewall and the second sidewall include a plurality of tabs that couple the first sidewall and the second sidewall to a top wall that bends inward upon receipt of the force.

20 Claims, 4 Drawing Sheets

CRUSH BOX FOR VEHICLE IMPACT

TECHNICAL FIELD

Embodiments described herein generally relate to a crush box for vehicle impact and, more specifically, to a crush box for a vehicle that provides consistent buckling.

BACKGROUND

Vehicles currently utilize a crush box to absorb energy received from a collision. However, the geometry of a vehicle and current crush boxes does not always allow for consistent deformation of the crush box in a collision. This is especially true in larger crush boxes. Longer crush boxes are often less stable and this inconsistency can lead to non-symmetric deformation and force transfer. Thus, a need exists in the industry.

SUMMARY

Embodiments of a crush box are described. One embodiment of the crush box includes a first sidewall that is coupled to a vehicle and a second sidewall that is coupled to the vehicle, where the first sidewall and the second sidewall include similarly pre-bent portions that cause the first sidewall and the second sidewall to bend outward upon receipt of a force. In some embodiments, the first sidewall and the second sidewall include a plurality of tabs that couple the first sidewall and the second sidewall to a top wall and bottom wall that bend inward upon receipt of the force.

In another embodiment, a system includes a vehicle and a crush box that is coupled to the vehicle. The crush box may include a first sidewall that is coupled to the vehicle, where the first sidewall includes a first sidewall securing surface to secure the first sidewall to the vehicle and a first lateral surface that is substantially perpendicular to the first sidewall securing surface. The first sidewall may further include a first plurality of tabs. The crush box may also include a second sidewall that is coupled to the vehicle, where the second sidewall includes a second sidewall securing surface to secure the second sidewall to the vehicle and a second lateral surface that is substantially perpendicular to the second sidewall securing surface. In some embodiments the second sidewall further includes a second plurality of tabs. Embodiments of the system may also include a top wall and a bottom wall that are coupled to the first plurality of tabs and the second plurality of tabs to create a substantially rectangular outer surface, where the first sidewall and the second sidewall include similarly pre-bent portions that cause the first sidewall and the second sidewall to bend outward upon receipt of a force.

In yet another embodiment, a vehicle with a crush box is disclosed, where the crush box includes a first sidewall that is coupled to the vehicle, and where the first sidewall includes a first lateral surface. In some embodiments, the first sidewall further includes a first plurality of tabs. The crush box may also include a second sidewall that is coupled to the vehicle, where the second sidewall includes a second lateral surface, and where the second sidewall further includes a second plurality of tabs. The crush box may also include a top wall that is coupled to the first plurality of tabs and the second plurality of tabs, where the first sidewall and the second sidewall include similarly pre-bent portions that cause the first sidewall and the second sidewall to bend according to a predetermined buckle configuration upon receipt of a force.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include a crush box for a vehicle impact. Some embodiments may utilize a pre-bent shape and strength in sidewalls of the crush box to control the deformation. The pre-bent shape of the sidewalls controls the deformation of the side walls. Tabs on the side walls control the deformation of an upper wall and lower wall. As the side walls deform outboard, this deformation pulls the upper and lower walls inboard. These events allow for the consistent deformation of the crush box. Without the pre-bent configuration and plurality of tabs to collapse the side portions, achieving consistent and symmetric deformation for all tested barrier heights would not be easily achieved with previous designs.

Some embodiments include sidewalls that have a pre-bent shape that allow them to bend outward during loading. Along with this pre-bent shape, the tabs on the side walls control the side portions of the crush box by pulling the side portions inward (into the crush box) while the side walls deform outward. Embodiments incorporating the same will be described in more detail, below.

Figure 1A:
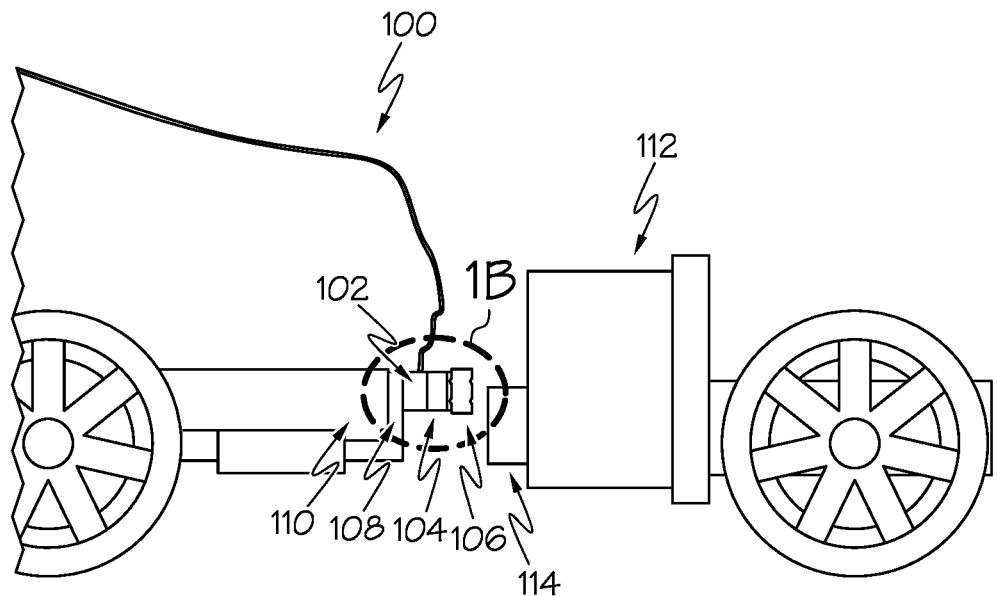
FIG. 1A depicts side view of a vehicle with a crush box, according to embodiments described herein.

Referring now to the drawings, FIG. 1A depicts side view of a vehicle 100 with a crush box 102, according to embodiments described herein. A crush box 102 is often included in a vehicle 100 such that when a front or rear impact occurs, the crush box 102 receives and dampens at least a portion of the force applied to the rear of the vehicle 100. Accordingly, the crush box 102 is also coupled to a bumper reinforcement 104, an energy absorbing (EA) foam 106, and the bumper reinforcement 104 which are covered by a bumper cover (not explicitly depicted in FIG. 1B). If an impact from another vehicle or barrier 112 occurs, the barrier element 114 (which may be constructed of an aluminum honeycomb structure or other similar configuration) of the barrier 112 may contact the bumper and thus the EA foam 106 of the vehicle 100. For low speed collisions (e.g., less than about 5 miles per hour) the crush box 102 receives force that was not absorbed by the EA foam 106. At this speed, the force is not enough to deform the crush box 102. For higher speed impacts (e.g., greater than about 35 miles per hour) the crush box 102 may absorb some energy, but this a small portion compared to the total amount of energy. In this scenario, the crush box does not absorb a high amount of energy, but instead consistently buckles to distribute force to the rear side members of the vehicle so that they can deform uniformly when the vehicle is struck by another vehicle/barriers at a variety of heights.

As illustrated in FIG. 1A, the barrier element 114 is asymmetrically aligned with the crush box 102 with respect to height. As such, many previous designs do not function properly to provide consistent buckling, as described herein.

As also illustrated, the crush box 102 is coupled to the vehicle 100 (such as via welding, bolting, etc.) by coupling to a lower back component 108. The lower back component 108 is also coupled to a rear side member 110. In some embodiments, the rear side member 110 may support the crush box 102 in place.

Figure 1B:
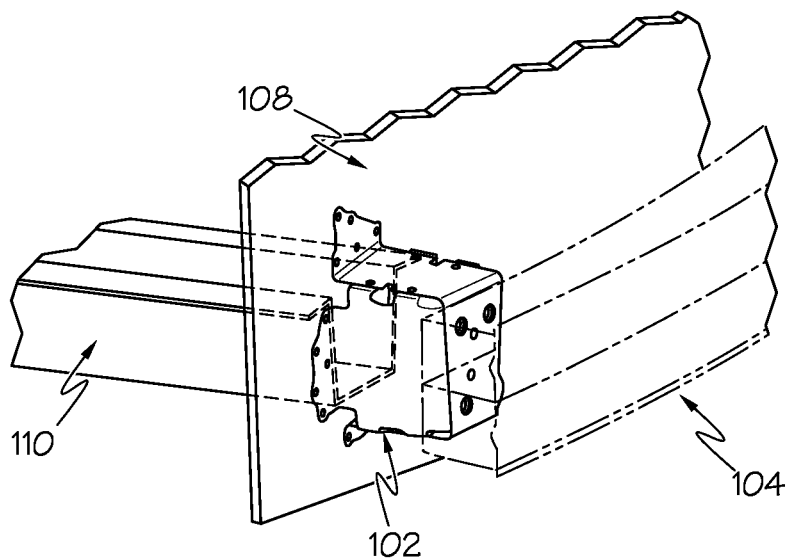
FIG. 1B depicts a perspective view of a crush box on a vehicle, according to embodiments described herein.

FIG. 1B depicts a perspective view of a crush box 102 on a vehicle 100, according to embodiments described herein. As illustrated, the crush box 102 is coupled to the vehicle 100 via welding, a plurality of screws, bolts, and/or other fasteners, which are attached to portions of the crush box 102 (described below). The crush box 102 may be supported by the lower back component 108 and/or the rear side member 110 of the vehicle 100. While not explicitly depicted in FIG. 1B, a bumper cover may also be included. The bumper cover may be constructed of a metal and/or plastic outer shell and may surround the crush box 102.

Additionally, while only one crush box 102 is depicted in FIG. 1B, one or more crush boxes 102 may be used on either the front and/or rear of the vehicle 100. In some embodiments, the crush box 102 may be shaped to substantially fit inside the bumper cover such that one or more of the surfaces of the crush box 102, the bumper reinforcement 104, and/or the EA foam 106 physically contact an inner surface of the bumper cover.

Figure 2:
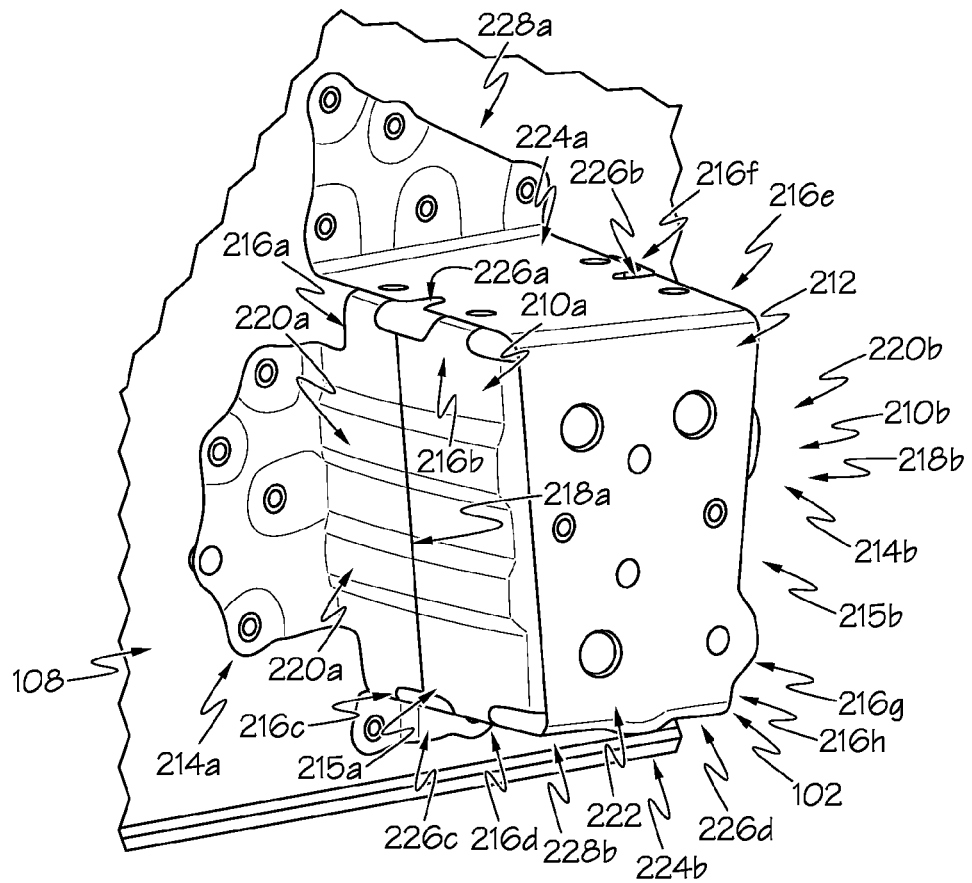
FIG. 2 depicts another perspective view of the crush box, according to embodiments described herein.

FIG. 2 depicts another perspective view of the crush box 102, according to embodiments described herein. As illustrated, the crush box 102 may include a first sidewall 210a and a second sidewall 210b. The first sidewall 210a and the second sidewall 210b may be coupled to a top wall 212 to create a substantially rectangular outer surface. The first sidewall 210a may include a first sidewall securing surface 214a and a first lateral surface 215a. The second sidewall 210b may include a second sidewall securing surface 214b and a second lateral surface 215b. The first sidewall securing surface 214a and the second sidewall securing surface 214b may be coupled to the lower back component 108, as described above.

The first sidewall securing surface 214a and a second sidewall securing surface 214b may or may not be disposed approximately perpendicular to the first sidewall 210a and second sidewall 210b, respectively. Also part of the lateral surfaces 215a, 215b are tabs 216a-216h, which may be coupled to the top wall 212. The lateral surfaces 215a, 215b may also include pre-bent portions 218a, 218b, respectively, which may be similarly pre-bent. As discussed in more detail below, the pre-bent portions 218a, 218b may determine a manner and location in which the crush box 102 buckles when force is applied to the top wall 212. The lateral surfaces 215a, 215b may also be configured with at least one ridgeline, such as ridgelines 220a, 220b, which, along with a predetermined thickness of the sidewalls 210a, 210b, may be used to determine an amount of force required for buckling the crush box 102. In some embodiments and depending on the material used for the sidewalls 210a, 210b, the thickness of the sidewalls 210a, 210b may range from about 1.0 millimeters to about 2.0 millimeters, and may be about 1.6 millimeters thick. Regardless and depending on the particular implementation, the crush box 102 may be configured to buckle when exposed to about 20 kilo-Newtons to about 250 kilo-Newtons.

As illustrated in FIG. 2, the sidewalls 210a, 210b may be individual components that are coupled to the top wall 212 only by the tabs 216a-216h. In these embodiments, there might be a space between the top wall 212 and the sidewalls 210a, 210b. In some embodiments, the sidewalls 210a, 210b are parts of a single structure that are connected by another surface that wraps under the top wall 212. In these embodiments, this other surface of the sidewalls 210a, 210b may contact an inner surface of the top wall 212.

Regardless, the top wall 212 includes a top portion 222, a first side portion 224a, and a second side portion 224b. The top portion 222 may be configured to be substantially parallel with the lower back component 108 or may be askew from the lower back component 108 to fit with the bumper cover that contains the crush box 102. The side portions 224a, 224b may or may not be disposed substantially perpendicular to the sidewalls 210a, 210b and may coupled with the sidewalls 210a, 210b via the tabs 216a-216h. Also provided on edges of the side portions 224a, 224b is at least one inlet, such as inlets 226a-226d. The inlets 226a-226d may be disposed between the tabs 216a, 216b, between tabs 216c, 216d, between tabs 216e, 216f, and/or between tabs 216g, 216h. The inlets 226a-226d may be configured to further define the buckling of the crush box 102 into a predetermined configuration.

Coupled to the side portions 224a, 224b are a first top wall securing portion 228a and a second top wall securing portion 228b. The top wall securing portions 228a, 228b may or may not be substantially perpendicular to the side portions 224a, 224b and may be configured to further secure the crush box 102 to the lower back component 108.

While the dimensions may vary, depending on the particular embodiment, the crush box 102 may range from about 50 millimeters to about 200 millimeters in both length and width. Additionally, the depth of the crush box 102 may range from about 50 millimeters to about 200 millimeters, depending on the embodiment.

Figure 3:
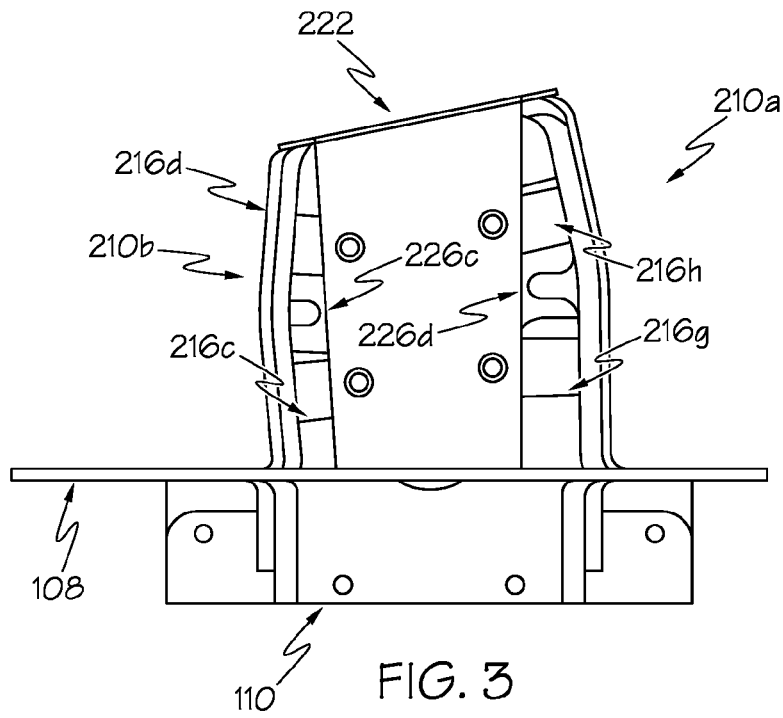
FIG. 3 depicts a bottom view of the crush box, according to embodiments described herein.

FIG. 3 depicts a bottom view of the crush box 102, according to embodiments described herein. As illustrated, the crush box 102 is secured to the vehicle 100 by securing the sidewall securing surfaces 214a, 214b and the top wall securing portions 228a, 228b to the lower back component 108 and the rear side member 110. Additionally illustrated is the askew angle at which the top portion 222 is disposed relative to the lower back component 108 and the rear side member 110. As discussed above, the top portion 222 may be disposed at an angle to accommodate the curvature and/or angle of the bumper reinforcement 104, which may or may not be askew.

Figure 4:
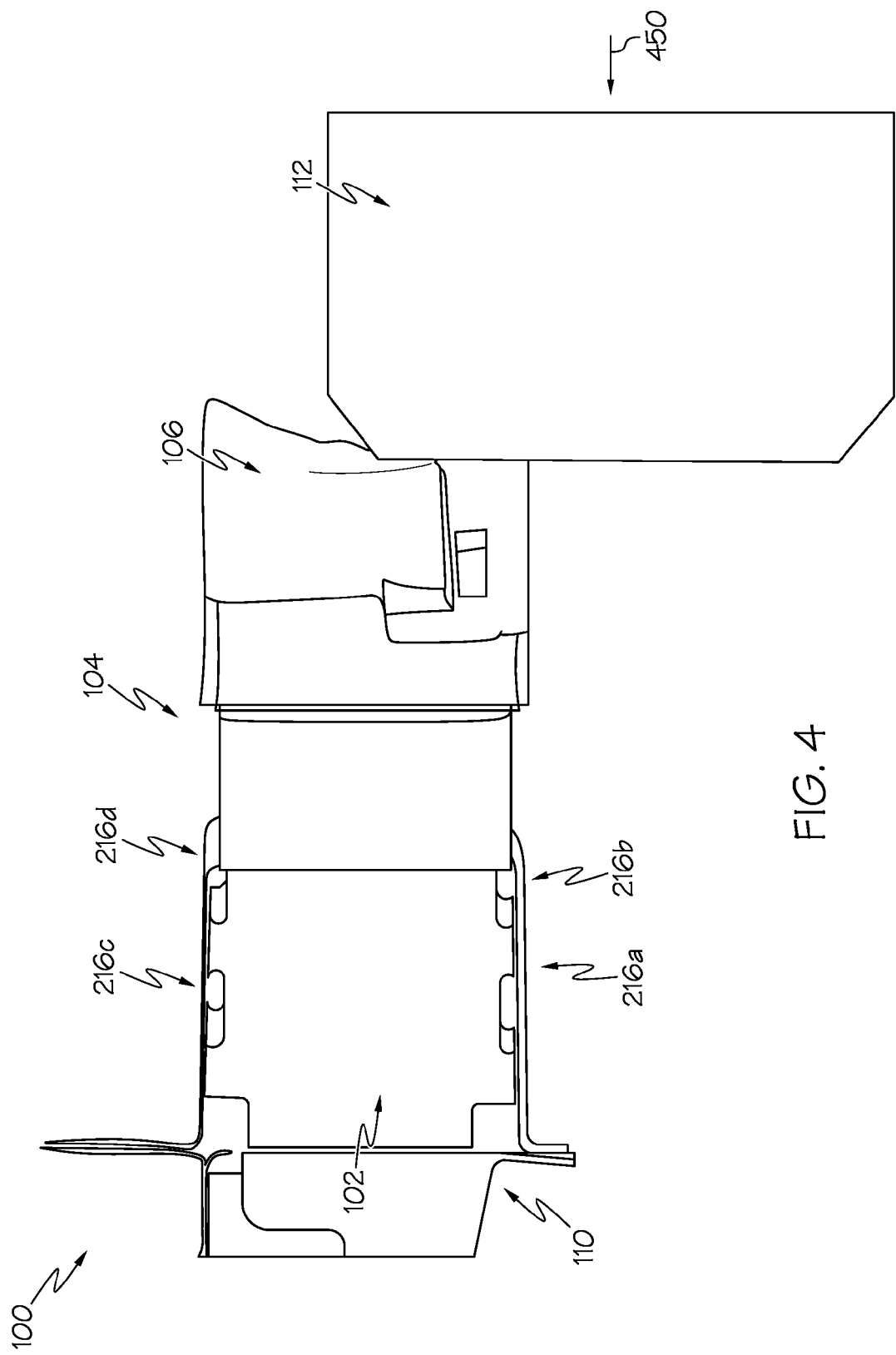
FIG. 4 depicts another side view of the crush box, with impact applied via a barrier, according to embodiments described herein.

FIG. 4 depicts another side view of the crush box 102, with impact applied via a barrier 112, according to embodiments described herein. As illustrated, the crush box 102 is coupled to the bumper reinforcement 104, which is coupled to the EA foam 106. As discussed above, these components may reside within a bumper cover. Additionally, a barrier 112 may contact the EA foam 106 to represent a collision by a vehicle 100. While the barrier 112 may contact the EA foam 106 in a substantially symmetrical manner (e.g., with the barrier 112 contacting an entire surface of the EA foam 106 and/or otherwise providing substantially equal force to the vertical surface of the EA foam 106 and thus the crush box 102. In this situation, the crush box 102 buckles according to a predetermined configuration.

The embodiment of FIG. 4 however, depicts the barrier 112 providing asymmetrical force such that the barrier 112 is not applying force substantially equally to a vertical surface of the EA foam 106 and thus is not providing force substantially symmetrically to all portions of the crush box 102. As illustrated, force 450 is provided in the direction of the arrow, which causes the EA foam 106 to asymmetrically buckle. Thus, the force 450 transferred to the crush box 102 may be asymmetrical as well. As illustrated, even though the force 450 is applied asymmetrically to the crush box 102, the crush box 102 is configured to buckle in a predetermined substantially symmetrical manner.

Figure 5A:
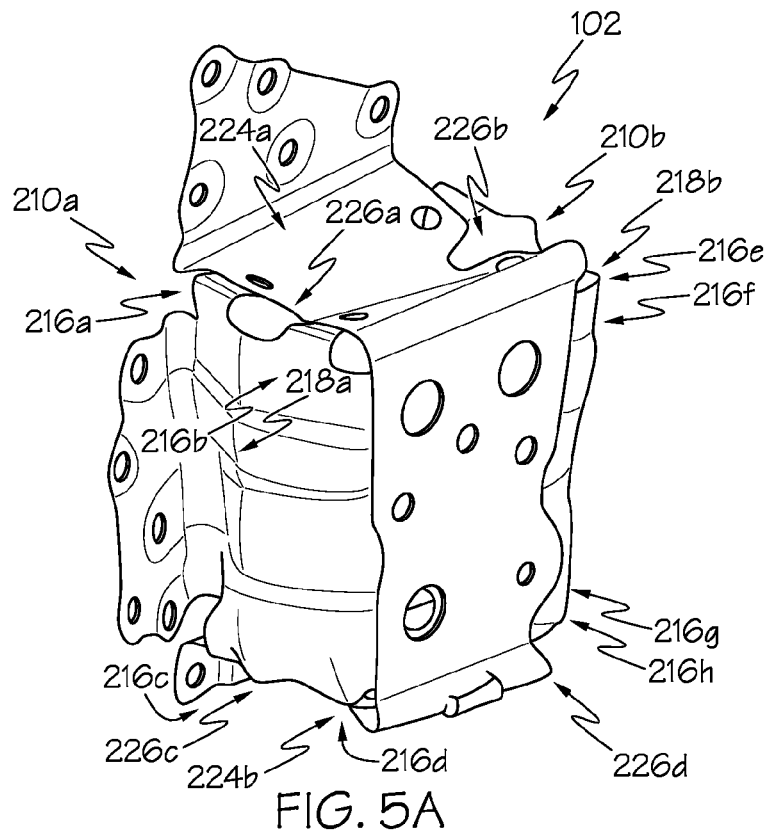
FIGS. 5A and 5B depict a perspective view of consistent buckling of the crush box at a plurality of points in time, according to embodiments described herein.
Figure 5B:
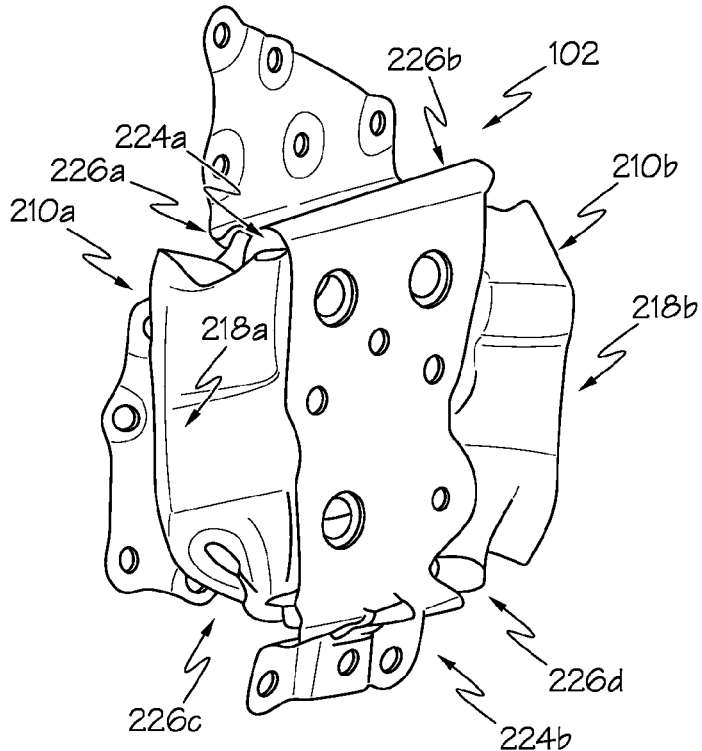

FIGS. 5A and 5B depict a perspective view of consistent buckling of the crush box 102 at a plurality of points in time, according to embodiments described herein. As illustrated in FIG. 5A, when a symmetrical or asymmetrical force is applied to the crush box 102, the sidewalls 210a, 210b begin to buckle externally around the pre-bent portions 218a, 218b. External bucking indicates that side portions 224a, 224b bend inward from the original position of the side portions 224a, 224b. Additionally, while the side portions 224a, 224b may or may not include pre-bent portions (which may be bent inward), the side portions 224a, 224b might include the inlets 226a-226d, which may also help define the predetermined buckling of the crush box 102. Specifically, the inlets 226a-226d, in conjunction with the tabs 216a-216h cause the side portions 224a, 224b to buckle inward (e.g., toward the center of the crush box 102), as the sidewalls 210a, 210b are buckling outward. As such, the crush box 102 may buckle symmetrically, according to a predetermined configuration.

As illustrated in FIG. 5B, as the force 450 is continually applied to the crush box 102, the sidewalls 210a, 210b continue to buckle outward along the pre-bent portions 218a, 218b and inward according to the tabs 216a-216h and inlets 226a-226d. This buckling will continue until the force 450 dissipates or until the crush box 102 is substantially flat. Thus, because the crush box 102 is symmetrically, flattened, the crush box 102 absorbed a maximum amount of energy.

As illustrated above, various embodiments of a crush box 102 are disclosed. These embodiments provide a consistent and predetermined buckle configuration, regardless of the position of the force. This allows for better force absorption and force transfer to the rear side member 110 for both symmetrical and asymmetrical forces.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes embodiments of a crush box for vehicle impact. It should also be understood that these embodiments are merely exemplary and are not intended to limit the scope of this disclosure.

What is claimed is:
1. A crush box, comprising:
  a first sidewall that is coupled to a vehicle;
  a second sidewall that is coupled to the vehicle,
  wherein the first sidewall and the second sidewall are similarly pre-bent portions that cause the first sidewall and the second sidewall to bend outward upon receipt of a force, and
  wherein the first sidewall and the second sidewall include a plurality of tabs that couple the first sidewall and the second sidewall to a top wall that bends towards a center of the crush box upon receipt of the force.

2. The crush box of claim 1, wherein the top wall comprises a first side portion and a second side portion that couples to the plurality of tabs to create a substantially rectangular outer surface.

3. The crush box of claim 1, wherein the force is applied asymmetrically to the crush box and wherein the crush box buckles substantially symmetrically in a predetermined buckle configuration.

4. The crush box of claim 1, wherein an inlet is disposed on the top wall between the plurality of tabs to define a location that the top wall buckles upon receipt of the force.

5. The crush box of claim 1, wherein the top wall comprises a pre-bent configuration that defines a location that the top wall buckles upon receipt of the force.

6. The crush box of claim 1, wherein the first sidewall and the second sidewall are individual pieces coupled to the top wall.

7. The crush box of claim 1, wherein the first sidewall and the second sidewall are parts of a single structure that is connected by another surface that wraps under the top wall.

8. A system, comprising:
  a vehicle; and
  a crush box that is coupled to the vehicle, the crush box comprising:
    a first sidewall that is coupled to the vehicle, wherein the first sidewall includes a first sidewall securing surface to secure the first sidewall to the vehicle and a first lateral surface that is substantially perpendicular to the first sidewall securing surface, and wherein the first sidewall further includes a first plurality of tabs;
    a second sidewall that is coupled to the vehicle, wherein the second sidewall includes a second sidewall securing surface to secure the second sidewall to the vehicle and a second lateral surface that is substantially perpendicular to the second sidewall securing surface, and wherein the second sidewall further includes a second plurality of tabs; and
    a top wall that is coupled to the first plurality of tabs and the second plurality of tabs to create a substantially rectangular outer surface,
  wherein the first sidewall and the second sidewall include similarly pre-bent portions that cause the first sidewall and the second sidewall to bend outward upon receipt of a force.

9. The system of claim 8, wherein the first plurality of tabs and the second plurality of tabs define a location on a side portion of the top wall that buckles in response to receipt of the force.

10. The system of claim 8, wherein the force is applied asymmetrically to the crush box and wherein the crush box buckles substantially symmetrically in a predetermined buckle configuration.

11. The system of claim 8, wherein an inlet is disposed on the top wall between the first plurality of tabs to define a location that the top wall buckles, upon receipt of the force.

12. The system of claim 8, wherein the top wall comprises a pre-bent configuration that defines a location that the top wall buckles, upon receipt of the force.

13. The system of claim 8, further comprising:
a bumper reinforcement that is coupled to the crush box; and
an energy absorbing foam that is coupled to the bumper reinforcement.

14. The system of claim 13, further comprising a bumper cover that covers the crush box, the bumper reinforcement, and the energy absorbing foam.

15. A vehicle with a crush box, the crush box comprising:
a first sidewall that is coupled to the vehicle, wherein the first sidewall includes a first lateral surface, wherein the first sidewall further includes a first plurality of tabs;
a second sidewall that is coupled to the vehicle, wherein the second sidewall includes a second lateral surface, wherein the second sidewall further includes a second plurality of tabs; and
a top wall that is coupled to the first plurality of tabs and the second plurality of tabs,
wherein the first sidewall and the second sidewall include similarly pre-bent portions that cause the first sidewall and the second sidewall to bend according to a predetermined buckle configuration upon receipt of a force, and the top wall bends towards a center of the crush box.

16. The vehicle of claim 15, wherein the first plurality of tabs and the second plurality of tabs define a location on a side portion of the top wall that buckles in response to receipt of the force.

17. The vehicle of claim 15, wherein the force is applied asymmetrically to the crush box and wherein the crush box buckles substantially symmetrically in the predetermined buckle configuration.

18. The vehicle of claim 15, wherein the top wall comprises a pre-bent configuration that defines a location that the top wall buckles upon receipt of the force.

19. The vehicle of claim 15, wherein an inlet is disposed on the top wall between the first plurality of tabs to define a location that the top wall buckles, upon receipt of the force.

20. The vehicle of claim 15, wherein at least one of the first lateral surface and the second lateral surface include a ridgeline that determines an amount of force required for buckling the crush box.

* * * * *

UNITED STATES PATENT AND TRADEMARK OFFICE
CERTIFICATE OF CORRECTION

PATENT NO. : 9,751,480 B1
APPLICATION NO. : 15/137728
DATED : September 5, 2017
INVENTOR(S) : William F. Graves et al.

It is certified that error appears in the above-identified patent and that said Letters Patent is hereby corrected as shown below:

In the Specification

In Column 4, Line 25, before "coupled", insert --be--.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*